US011858117B2

(12) United States Patent
Huang et al.

(10) Patent No.: US 11,858,117 B2
(45) Date of Patent: Jan. 2, 2024

(54) DUAL-PURPOSE MECHANICS CREEPER

(71) Applicant: HIEVER CO., LTD., Taichung (TW)

(72) Inventors: Tony Huang, Taichung (TW); Jeffery Huang, Taichung (TW)

(73) Assignee: HIEVER CO., LTD., Taichung (TW)

( * ) Notice: Subject to any disclaimer, the term of this patent is extended or adjusted under 35 U.S.C. 154(b) by 55 days.

(21) Appl. No.: 17/733,384

(22) Filed: Apr. 29, 2022

(65) Prior Publication Data

US 2023/0121228 A1 Apr. 20, 2023

(30) Foreign Application Priority Data

Oct. 18, 2021 (TW) ................................ 110212208

(51) Int. Cl.
*B25H 5/00* (2006.01)

(52) U.S. Cl.
CPC ..................................... *B25H 5/00* (2013.01)

(58) Field of Classification Search
CPC ....................................................... B25H 5/00
See application file for complete search history.

(56) References Cited

U.S. PATENT DOCUMENTS

| | | | | | |
|---|---|---|---|---|---|
| 4,632,410 | A * | 12/1986 | Bainbridge | A47C 13/00 | 297/135 |
| 4,815,569 | A * | 3/1989 | Norman | B25H 5/00 | 280/32.6 |
| 4,895,380 | A * | 1/1990 | Brooks | B25H 5/00 | 280/32.6 |
| 5,707,067 | A * | 1/1998 | Smith | B25H 5/00 | 280/32.6 |
| 5,790,997 | A * | 8/1998 | Ruehl | A47C 17/162 | 297/316 |
| 6,095,532 | A * | 8/2000 | Martin | B25H 5/00 | 280/30 |
| 6,824,149 | B1 * | 11/2004 | Whitlock | B25H 5/00 | 280/47.35 |
| 6,834,868 | B1 * | 12/2004 | Blackburn | B25H 5/00 | 280/32.6 |
| 7,025,421 | B1 * | 4/2006 | Fowler | A47C 3/36 | 297/325 |
| 7,188,843 | B2 * | 3/2007 | Magness | B62B 5/0003 | 280/30 |
| 7,331,596 | B2 * | 2/2008 | Tiramani | B25H 1/12 | 280/30 |
| 7,481,438 | B2 * | 1/2009 | Hernandez | B25H 5/00 | 280/32.6 |
| 8,777,237 | B2 * | 7/2014 | Brittingham | B25H 5/00 | 280/32.6 |
| 9,061,413 | B2 * | 6/2015 | Huang | B25H 5/00 | |

(Continued)

*Primary Examiner* — James M Dolak
(74) *Attorney, Agent, or Firm* — Birch, Stewart, Kolasch & Birch, LLP

(57) ABSTRACT

A dual-purpose mechanics creeper includes: a flat board, a first swing arm and a second swing arm pivotally attached to a bottom surface of the flat board. Each swing arm includes a plurality of rollers. When each swing arm is at the first position, it is adjacent to the bottom surface of the flat board. When the swing arm is at the second position, it is perpendicular to the flat board. When the second swing arm is at the second position, it is attached to the first swing arm, such that the second swing arm is obliquely supported between the flat board and the first swing arm.

9 Claims, 11 Drawing Sheets

(56) References Cited

U.S. PATENT DOCUMENTS

| | | | | | |
|---|---|---|---|---|---|
| 9,193,064 | B2 * | 11/2015 | Dall'Armi | B25H 5/00 | |
| 9,610,682 | B2 * | 4/2017 | Shaner | B25H 5/00 | |
| 9,623,551 | B1 * | 4/2017 | Bowen | B25H 5/00 | |
| D843,675 | S * | 3/2019 | Shrock | B25H 5/00 | D34/23 |
| 10,492,611 | B2 * | 12/2019 | Huang | A47C 7/006 | |
| 10,524,576 | B2 * | 1/2020 | Huang | B25H 5/00 | |
| 10,661,431 | B1 * | 5/2020 | Hightower | B25H 5/00 | |
| 11,787,036 | B1 * | 10/2023 | Shrock | B25H 5/00 | 280/32.6 |
| 2004/0227313 | A1 * | 11/2004 | Shockley | B25H 5/00 | 280/32.6 |
| 2007/0235960 | A1 * | 10/2007 | Pantaleoni | B25H 5/00 | 280/32.6 |
| 2016/0039088 | A1 * | 2/2016 | Blasjo | B25H 5/00 | 280/32.6 |

* cited by examiner

DUAL-PURPOSE MECHANICS CREEPER

BACKGROUND OF THE INVENTION

1. Technical Field

The present invention is related to a mechanics creeper, and in particular, to a dual-purpose mechanics creeper.

2. Description of Related Art

During the repair of a vehicle, a mechanics creeper is often used, and U.S. D406,432 discloses an example of a known mechanics creeper. A horizontal flat type of creeper typically includes a flat board and a plurality of rollers installed at the bottom or side edge of the flat board, allowing a repair person to lay on the flat board and to move easily on the floor.

In addition, during the repair of the internal of a vehicle, such as mechanisms underneath the driver's seat of a car, another vertical standing type of mechanics creeper is also used, such as the Dash Diver manufactured by FVP company. Such type of vertical standing type of mechanics creeper includes a flat board and a supporting column arranged underneath the flat board. During its use, one end of the flat board is placed to abut against the vehicle chassis, and the other end is supported by the supporting column, thereby allowing the operator to lay on the flat board to perform repair works. Although the aforementioned two types of products are able to achieve their original functions, the two cannot be integrally used.

BRIEF SUMMARY OF THE INVENTION

The primary objective of the present invention is to provide a dual-purpose mechanics creeper, allowing the mechanics creeper to be switched between a horizontal flat state and a vertical standing state for use.

To achieve the aforementioned primary objective, the dual-purpose mechanics creeper comprises: a flat board of an elongated shape, having a top surface and bottom surface, and the bottom surface having a first pivotal connecting base and second pivotal connecting base. A first swing arm comprises: two rollers; the first swing arm using one end to pivotally attach to the first pivotal connecting base of the bottom surface of the flat board, the two rollers arranged at another end of the first swing arm; the first swing arm configured to move between a first position adjacent to the bottom surface of the flat board and a second position away from the bottom surface of the flat board. A second swing arm comprises: two rollers; the second swing arm using one end to pivotally attach to the second pivotal connecting base of the bottom surface of the flat board, the two rollers arranged at another end of the second swing arm; the second swing arm configured to move between a first position adjacent to the bottom surface of the flat board and a second position approaching the first swing arm; such that when the second swing arm moves to the second position, the second swing arm is able to attach and secure to the first swing arm, allowing the second swing arm to be under the state of being obliquely supported between the flat board and the first swing arm.

The dual-purpose mechanics creeper of the present invention according to the aforementioned structure can be flatly placed on the floor when it is not deployed, in order to be used as a horizontal flat mechanics creeper. After it is deployed, one end of the flat board can be placed to abut against the vehicle chassis, in order to be used as a vertical standing mechanics creeper.

Preferably, the first swing arm comprises: a longitudinal shaft and a lateral shaft. The longitudinal shaft is divided into a upper section and a lower section. The lower section is inserted inside the upper section, in order to allow the lower section to move relative to the upper section. Accordingly, the overall length of the longitudinal shaft can be changed.

Preferably, the second swing arm comprises a longitudinal shaft and a lateral shaft. One side of the lateral shaft includes two supporting columns. A separation distance between the two supporting columns is equivalent to the width of the longitudinal shaft of the first swing arm, in order to increase the stability of the attachment between the first swing arm and the second swing arm.

Preferably, one end of the bottom surface of the flat board further includes two rollers.

DETAILED DESCRIPTION OF THE INVENTION

Figure 1:
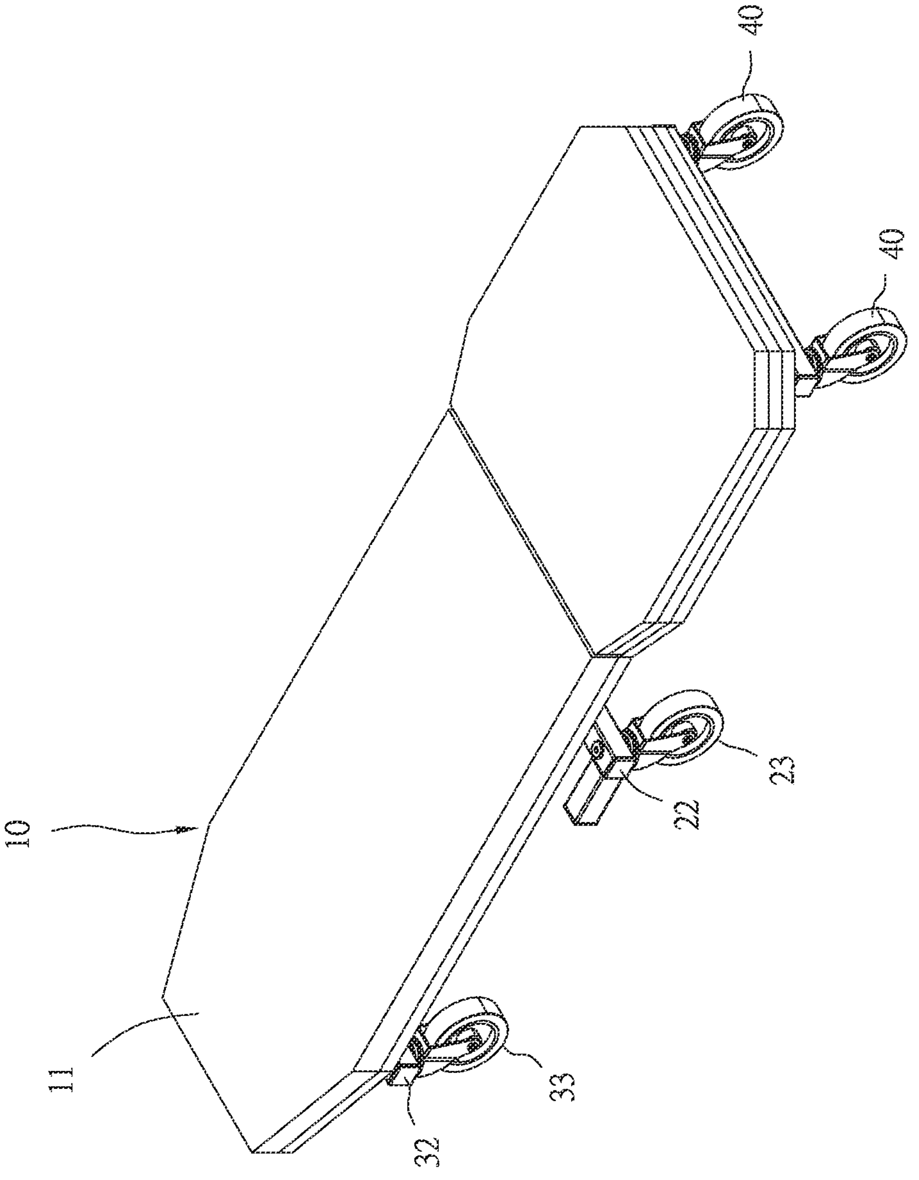
FIG. 1 is an appearance perspective view of the first preferred embodiment of the present invention.

The applicant emphasizes that for the content of this specification, including the embodiments and the claims described in the following, relevant directional terms shall refer to the directions shown in the drawings in principle. In addition, for the embodiments and drawings described in the following, identical component signs refer to identical or similar components or structural features.

As shown in FIG. 1 to FIG. 7, according to a first embodiment of the present invention, the dual-purpose mechanics creeper comprises:

A flat board 10 of an elongated shape, having a top surface 11 and bottom surface 12. The bottom surface of the flat board includes a first pivotal connecting base 13 and a second pivotal connecting base 14, one side of each one of the pivotal connecting bases includes a locking member 15. To increase the comfort during use, the top surface 11 can be further installed with a foam or a soft pad.

A first swing arm 20 comprises: a longitudinal shaft 21, a lateral shaft 22 and two rollers 23. The first swing arm 20 uses one end of the longitudinal shaft 21 to pivotally attach to the first pivotal connecting base 13 of the bottom surface of the flat board, the lateral shaft 22 is arranged at another end of the longitudinal shaft 21, and the two rollers 23 are arranged on the lateral shaft 22. The first swing arm 20 is able to move between a first position adjacent to the bottom surface 12 of the flat board and a second position away from the bottom surface 12 of the flat board. One side of the longitudinal shaft 21 includes an engagement portion 24.

In this embodiment, the longitudinal shaft 21 is divided into a upper section and a lower section. The lower section 211 is inserted into the upper section 212, in order to allow the lower section 211 to move relative to the upper section 212, thereby changing an overall length of the longitudinal shaft. A securement structure 213 can be arranged between the upper section 212 and the lower section 211 in order to engage with and secure the upper section and the lower section. In this embodiment, the upper section and the lower section includes through holes. The securement structure is inserted into the through holes formed on the upper section and the lower section in order to achieve locking and securement; however, the present invention is not limited to such securement method only. The present invention may also other securement methods, such as bolts or clamp, to achieve the effect of securing the upper section and the lower section.

A second swing arm 30 comprises: a longitudinal shaft 31, a lateral shaft 32 and two rollers 33. The second swing arm 30 uses one end of the longitudinal shaft 31 to pivotally attach to the second pivotal connecting base 14 of the bottom surface of the flat board, the lateral shaft 32 is arranged at another end of the longitudinal shaft 31, and the two rollers 33 are arranged on the lateral shaft 32. In addition, the lateral shaft 32 further includes an engagement member 34 arranged thereon. The second swing arm 30 is able to move between a first position adjacent to the bottom surface 12 of the flat board and a second position approaching the first swing arm 20. When the second swing arm 30 is at the first position, the lateral shaft 32 is adjacent to the bottom surface 12 of the flat board. When the second swing mar 30 moves to the second position, the engagement member 34 on the lateral shaft 32 is able to correspondingly engage with the engagement portion 24 of the first swing arm.

In this embodiment, one side of lateral shaft 32 of the second swing arm comprises two supporting columns 35. A separation distance between the two supporting columns 35 is equivalent to the width of the longitudinal shaft 21 of the first swing arm, in order to increase the stability of the attachment between the first swing arm and the second swing arm. The engagement member 34 is arranged on one of the supporting columns 35. In this embodiment, the engagement member 34 is an insertion pin; however, the present invention is not limited to such type only.

The two rollers 40 are arranged at one end of the bottom surface 12 of the flat board.

Figure 2:
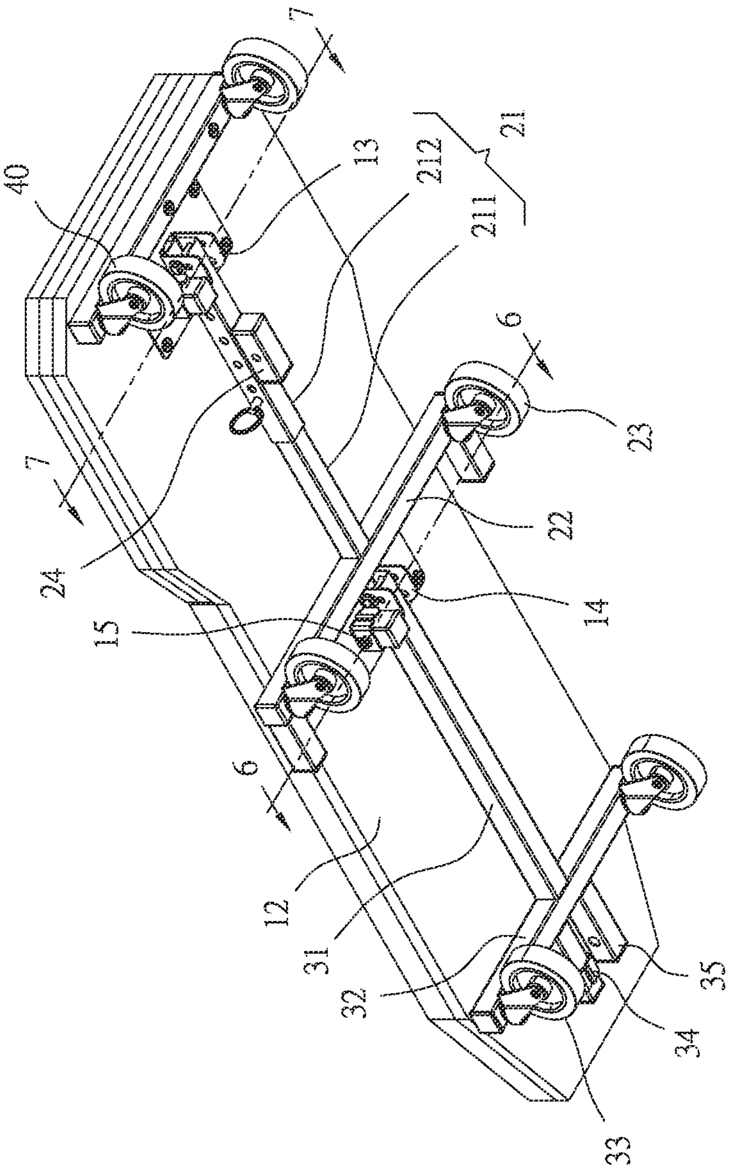
FIG. 2 is a perspective view of the first preferred embodiment of the present invention viewed from another angle.

When the structure of the present invention is used as a horizontal flat mechanics creeper, the first swing arm 20 and the second swing arm 30 are located at the first position. In other words, the first swing arm 20 and the second swing arm 30 are located at positions adjacent to the bottom surface 12 of the flat board, as shown in FIG. 1 and FIG. 2. Under such condition, the dual-purpose mechanics creeper can be flatly placed on the floor for use, and the rollers 23 of the first swing arm, the rollers 33 of the second swing arm and the two rollers 40 can be used to move on the floor, in such a way similar to a conventional horizontal flat mechanics creeper. To further increase the stability between the first swing arm 20 and the second swing arm 30, the locking member of the first pivotal connecting base 13 is correspondingly locked inside a through hole 25 of the first swing arm, and the locking member of the second pivotal connecting base 14 is correspondingly locked inside a through hole 36 of the second swing arm 30.

Figure 3:
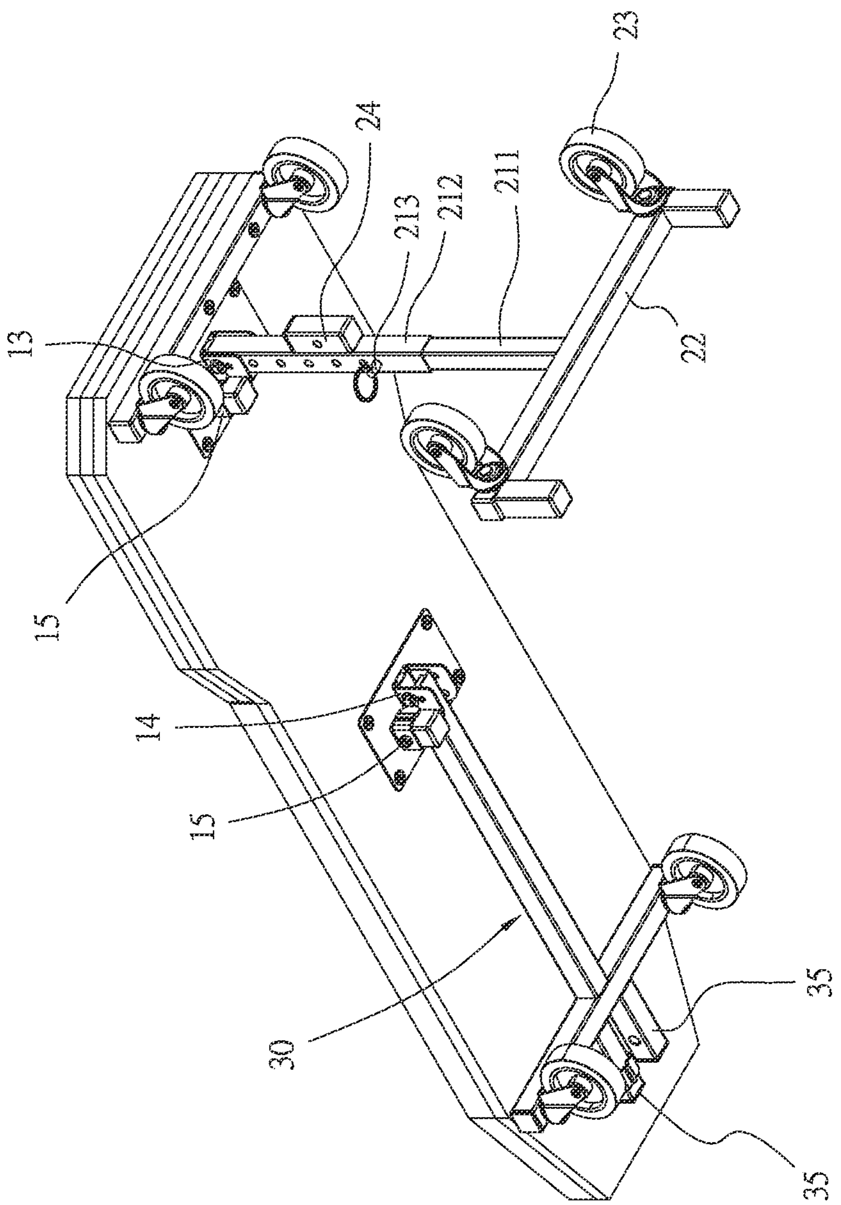
FIG. 3 is a schematic view of the first preferred embodiment of the present invention during the operation of the first swing arm.
Figure 4:
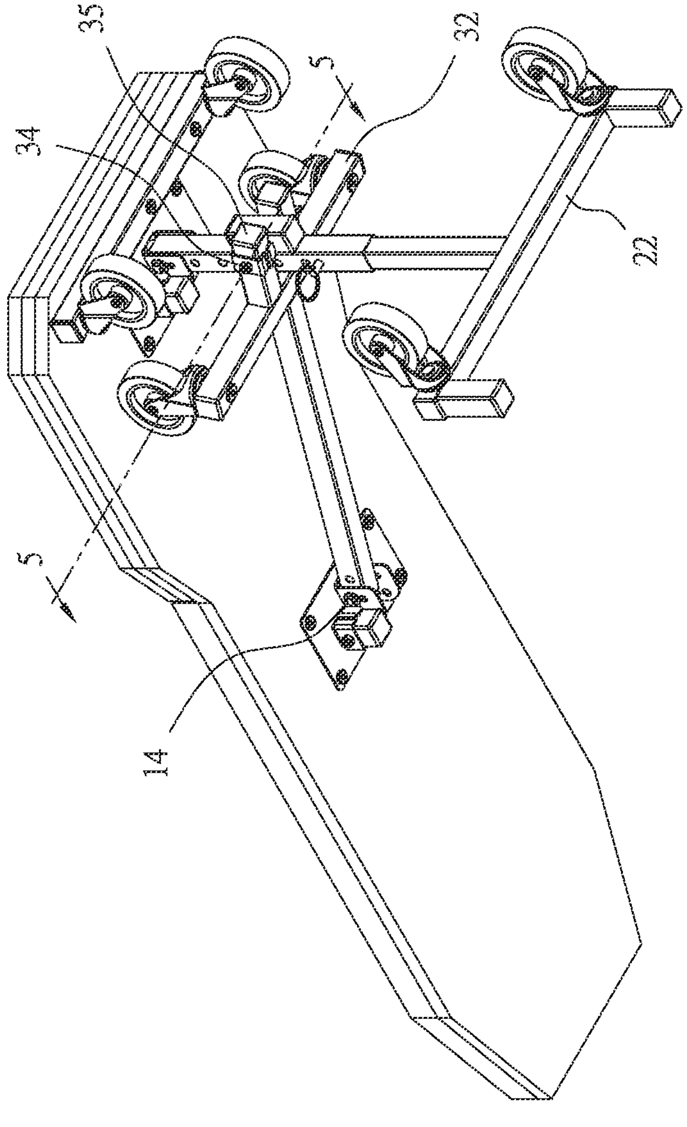
FIG. 4 is a schematic view of the first preferred embodiment of the present invention during the operation of the second swing arm.
Figure 5:
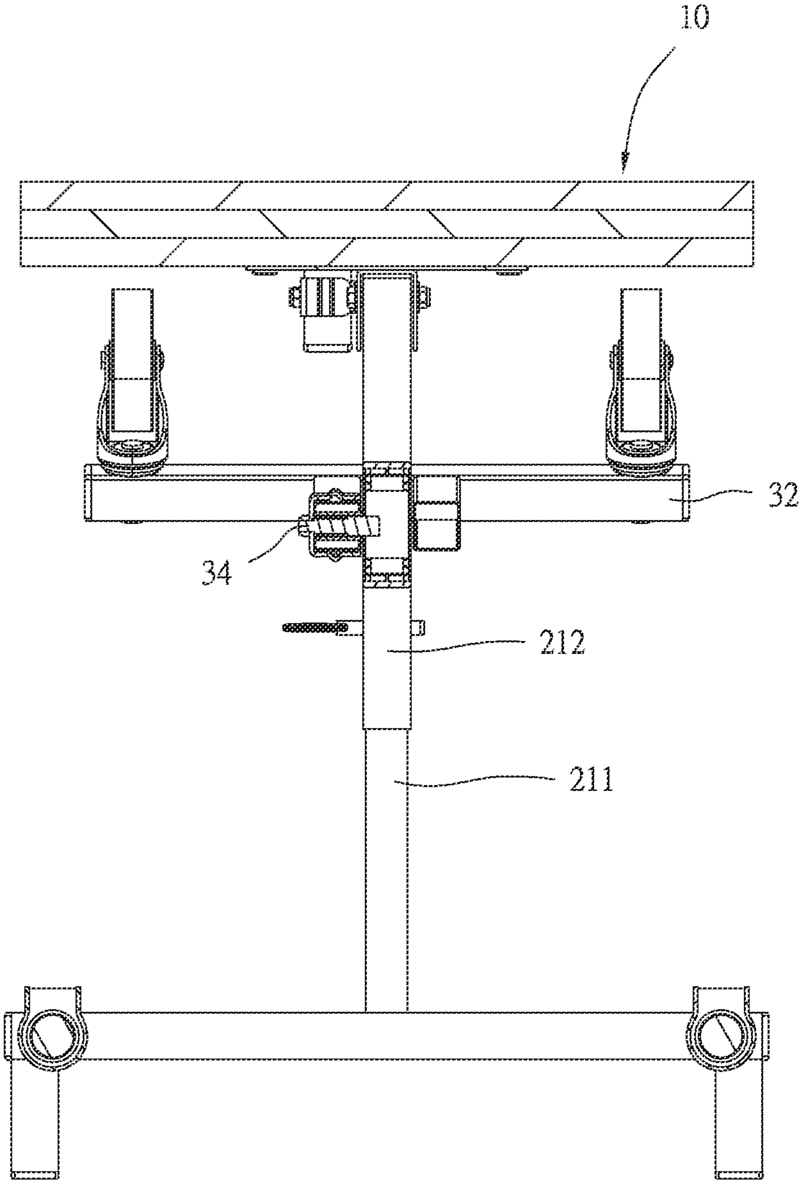
FIG. 5 is a cross sectional view taken along the cross sectional line 5-5 in FIG. 4.
Figure 6:
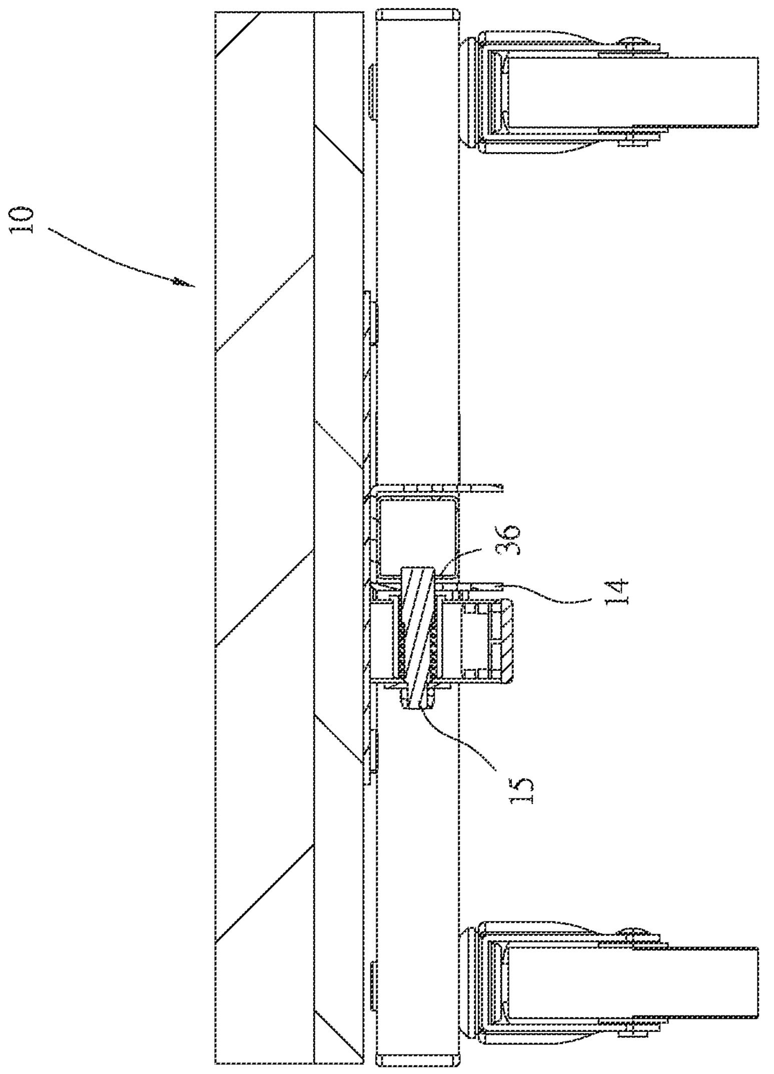
FIG. 6 is a cross sectional view taken along the cross sectional line 6-6 in FIG. 2.
Figure 7:
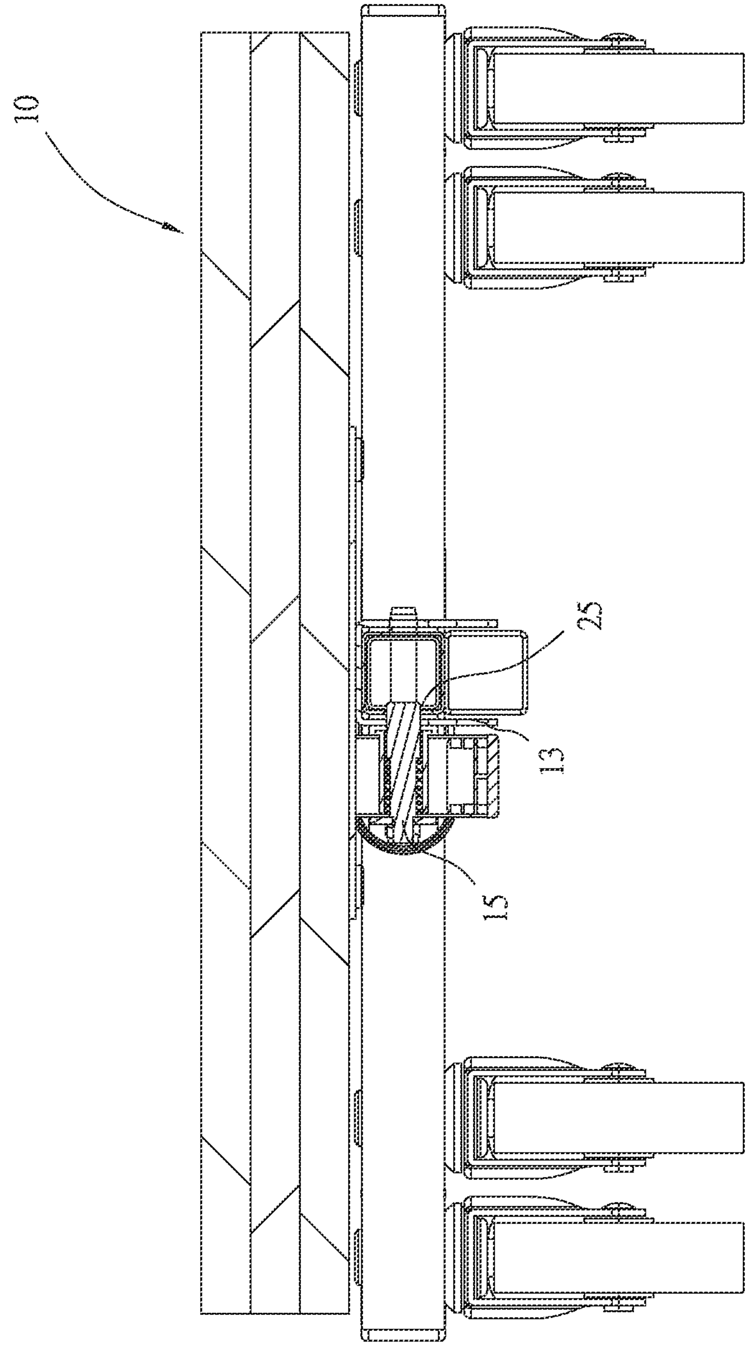
FIG. 7 is a cross sectional view taken along the cross sectional line 7-7 in FIG. 2.

When there is a need to erect the first swing arm 20 for use, the user can simply adjust the first swing arm from the first position to the second position, as shown in FIG. 3. At this time, the longitudinal shaft 21 of the first swing arm is able to move from the original position adjacent to the bottom surface 12 of the flat board to the vertical standing position, and an angle is formed with the bottom surface 12 of the flat board, and such angle is preferably to be 90 degrees. Next, the second swing arm 30 is adjusted from the first position to the second position. In other words, the second swing arm 30 is moved from the original position adjacent to the bottom surface 12 of the flat board to the position intersecting with the first swing arm 20. At this time, the longitudinal shaft 21 of the first swing arm is located between the two supporting columns 35 of the second swing arm, and the engagement member 34 of the second swing arm is correspondingly engaged at the engagement portion 24 of the first swing arm, as shown in FIG. 5. The second swing arm 30 can then be obliquely supported between the bottom surface 12 of the flat board and the first swing arm 20, as shown in FIG. 4. Accordingly, the dual-purpose mechanics creeper can be transformed from the original use state of horizontal flat type on the floor to the use state of vertical standing type for use, thereby achieving the objective of dual-purpose of use for the repair of driver's seat.

Figure 8:
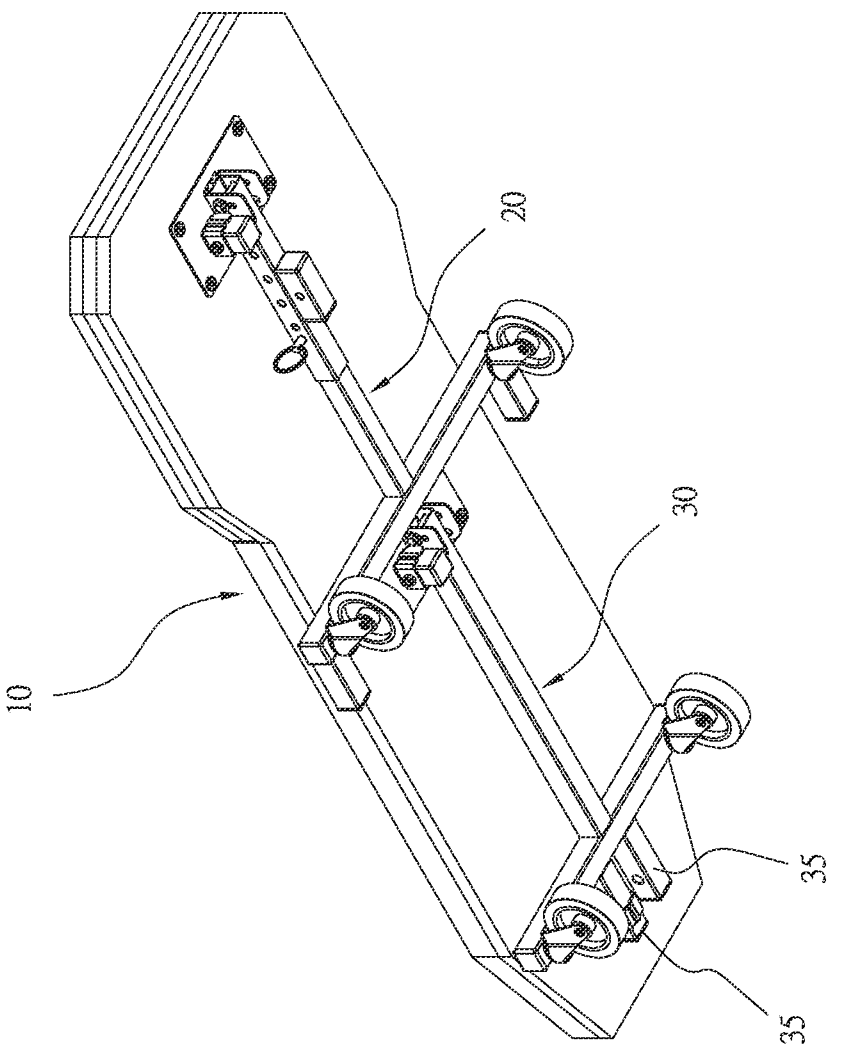
FIG. 8 is a perspective view of the bottom surface of the second preferred embodiment of the present invention.

FIG. 8 shows a second embodiment of the present invention. The structure of the second embodiment is similar to the structure of the first embodiment, and the difference relies in that the bottom surface 12 of the flat board does not include two rollers 40. Although the quantity of the rollers installed at the bottom surface of the flat board may affect the supporting strength and stability of the flat board during the use under the horizontal flat state, the use of the rollers of the first swing arm and the rollers of the second swing arm as the support without installation of rollers on the bottom surface of the flat board can also achieve the same effect.

Figure 9:
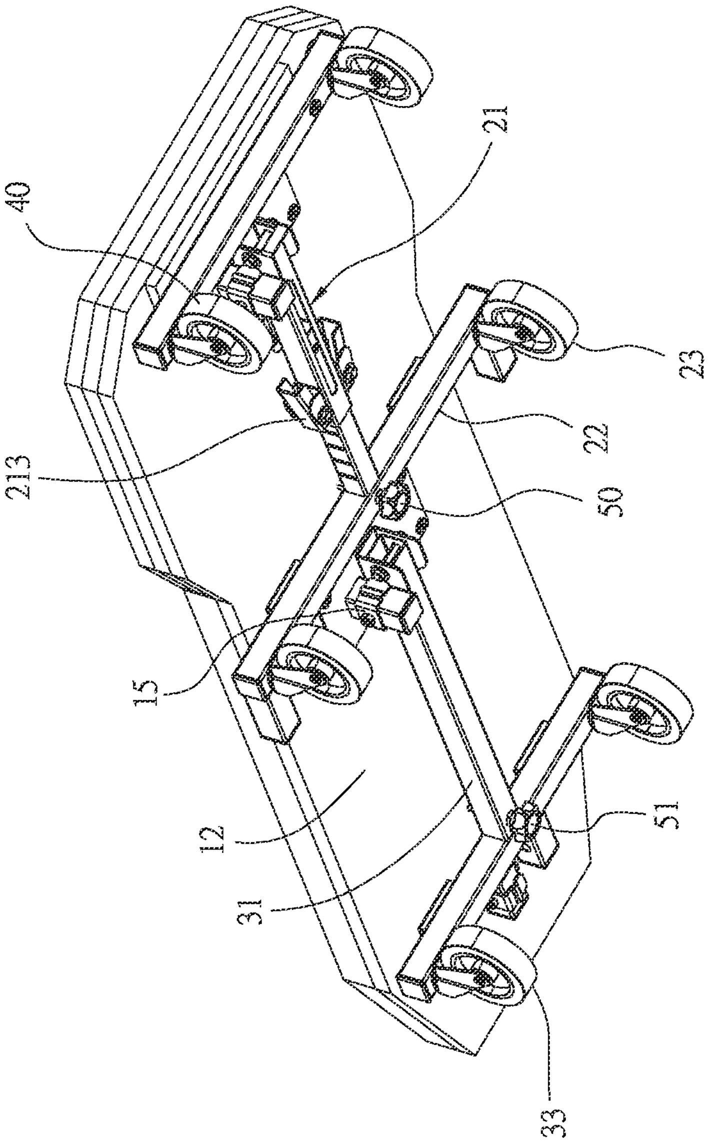
FIG. 9 is a perspective view of the bottom surface of the third preferred embodiment of the present invention.
Figure 10:
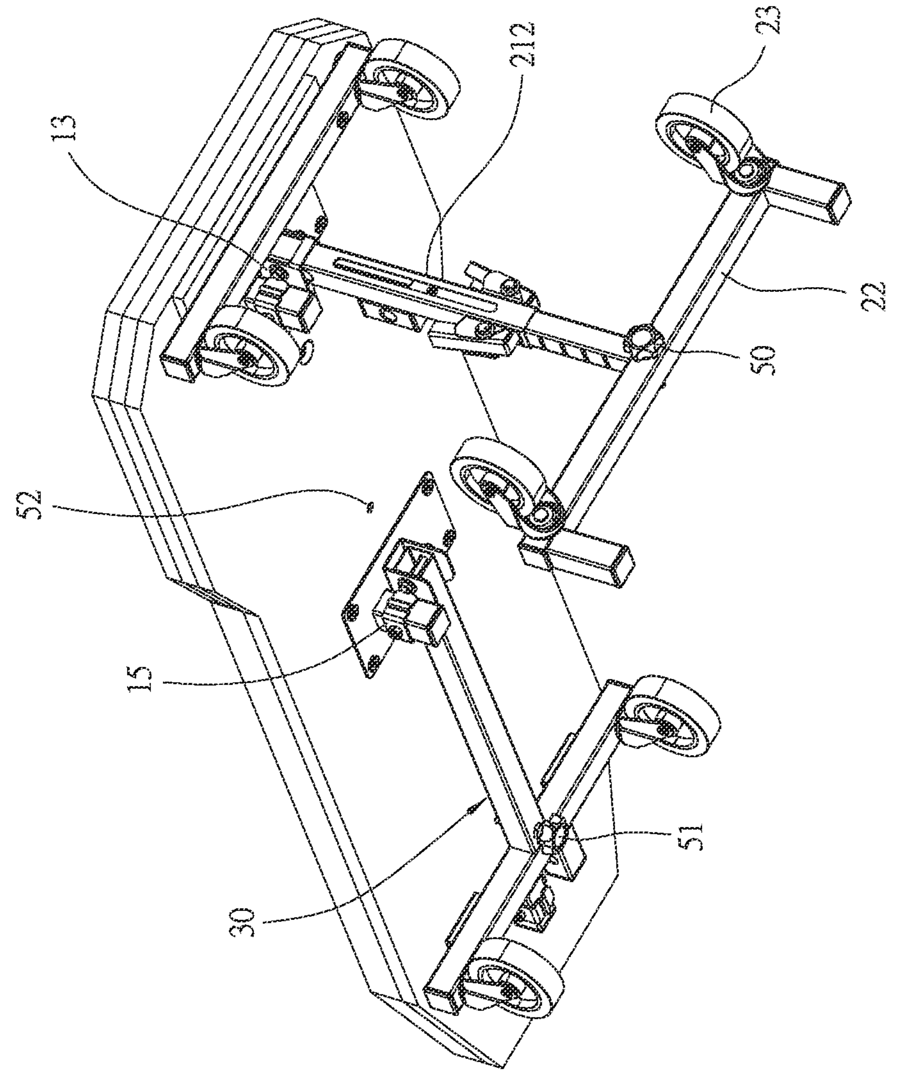
FIG. 10 is a schematic view of the third preferred embodiment of the present invention during the operation of the first swing arm.
Figure 11:
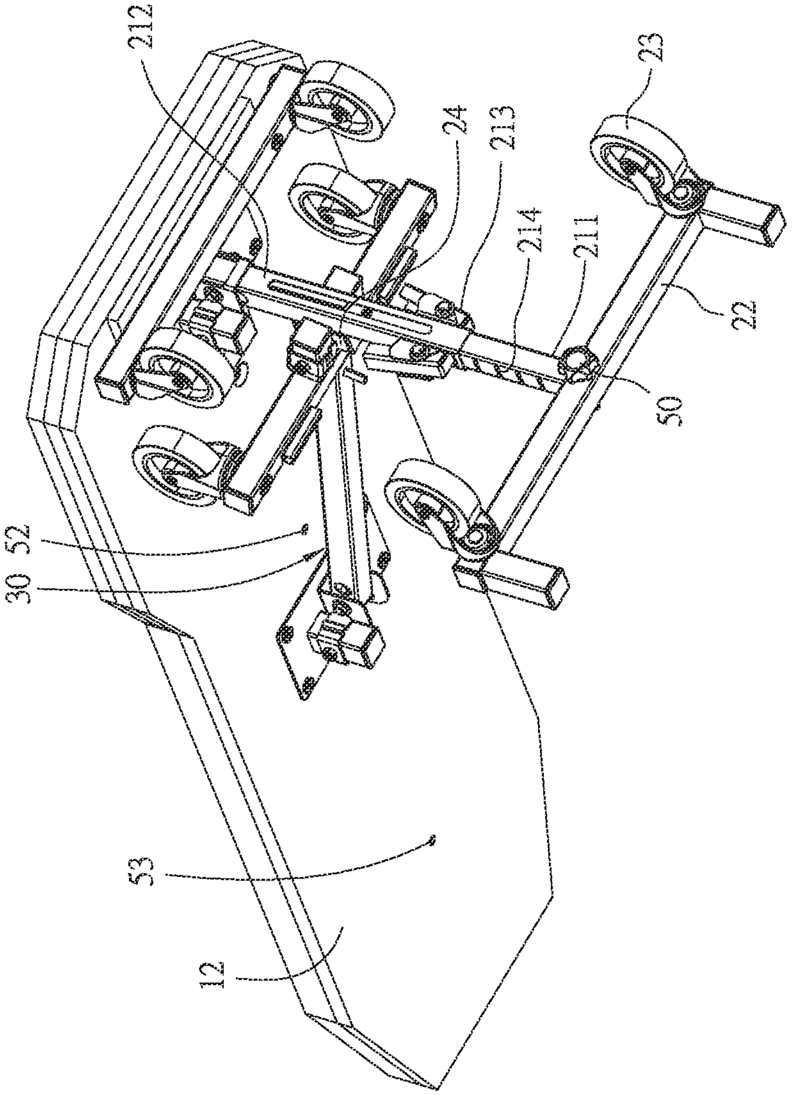
FIG. 11 is a schematic view of the third preferred embodiment of the present invention during the operation of the second swing arm.

FIG. 9 to FIG. 11 show a third embodiment of the present invention. Similar to the first embodiment, the third embodiment of the present invention comprises: a flat board 10, and a first swing arm 20 comprises: a longitudinal shaft 21, a lateral shaft 22 and two rollers 23. A second swing arm 30 comprises: a longitudinal shaft 31, a lateral shaft 32 and two rollers 33, and two rollers 40. The difference between the third embodiment and the first embodiment relies in that the longitudinal shaft 21 is divided into a upper section and a lower section. The lower section 211 is inserted into the upper section 212, in order to allow the lower section 211 to move relative to the upper section 212, thereby changing an overall length of the longitudinal shaft. A securement structure 213 can be arranged between the upper section 212 and the lower section 211 in order to engage with and secure the upper section and the lower section 211. In this embodiment, the securement structure 213 is a clamp, and the clamp comprises two clamping arms respectively arranged at two sides of the upper section 212, and the lower section 211 includes a plurality of corresponding locking slots 214 formed thereon, thereby allowing the two clamping arms to lock at the corresponding locking slots opposite from each other. Such clamping method can be more easily operated in comparison to the aforementioned insertion pin method.

Moreover, for secure the first swing arm 20 and the second swing arm 30 on the flat board 10 tightly. Two secure members 50 and 51 are provided on the first swing arm 20 and the second swing arm 30 individually. There are two secure holes 52 and 53 provided on the bottom surface 12 of the flat board 10 corresponding to the position of the secure member 51 and secure member 51. In this embodiment, these two secure members are bolts and the secure hole are screw holes.

What is claimed is:

1. A dual-purpose mechanics creeper, comprising:

a flat board of an elongated shape, having a top surface and a bottom surface, and the bottom surface of the flat board having a first pivotal connecting base and a second pivotal connecting base;

a first swing arm comprising: a longitudinal shaft, a lateral shaft and two rollers; the first swing arm using one end of the longitudinal shaft to pivotally attach to the first pivotal connecting base of the bottom surface of the flat board, the lateral shaft arranged at another end of the longitudinal shaft, the two rollers arranged on the lateral shaft; the first swing arm configured to move between a first position adjacent to the bottom surface of the flat board and a second position away from the bottom surface of the flat board; one side of the longitudinal shaft having an engagement portion; and a second swing arm comprising: a longitudinal shaft, a lateral shaft and two rollers; the second swing arm using one end of the longitudinal shaft to pivotally attach to the second pivotal connecting base of the bottom surface of the flat board, the lateral shaft arranged at another end of the longitudinal shaft, the two rollers arranged on the lateral shaft, the lateral shaft further including an engagement member arranged thereon; the second swing arm configured to move between a first position adjacent to the bottom surface of the flat board and a second position connects with the first swing arm; such that when the first swing arm and the second swing arm move to the second position, the engagement member on the lateral shaft of the second swing arm engages with the engagement portion of the first swing arm, wherein one side of the lateral shaft of the second swing arm includes two supporting columns, the two supporting columns are arranged spaced apart from each other by a separation distance equivalent to a width of the longitudinal shaft of the first swing arm, and the engagement member of the second swing arm is arranged on one of the supporting columns.

2. The dual-purpose mechanics creeper according to claim 1, wherein the longitudinal shaft of the first swing arm is divided into a upper section and a lower section, allowing the two upper and lower sections to move relative to each other, thereby changing an overall length of the longitudinal shaft.

3. The dual-purpose mechanics creeper according to claim 2, wherein a securement structure is arranged between the upper section and the lower section and is configured to engage with and secure the upper section and the lower section.

4. The dual-purpose mechanics creeper according to claim 3, wherein one side of the first pivotal connecting base includes a locking member.

5. The dual-purpose mechanics creeper according to claim 4, wherein one side of the second pivotal connecting base includes a locking member.

6. The dual-purpose mechanics creeper according to claim 3, wherein one side of the second pivotal connecting base includes a locking member.

7. The dual-purpose mechanics creeper according to claim 5, wherein one end of the bottom surface of the flat board further includes two rollers.

8. The dual-purpose mechanics creeper according to claim 1, wherein one end of the bottom surface of the flat board further includes two rollers.

9. The dual-purpose mechanics creeper according to claim 3, wherein the securement structure is a clamp; the clamp comprises two clamping arms respectively arranged at two sides of the upper section, and the lower section includes a plurality of corresponding locking slots formed thereon, thereby allowing the two clamping arms to lock at the corresponding locking slots opposite from each other.

* * * * *